US012542048B2

(12) United States Patent
Sweeney et al.

(10) Patent No.: US 12,542,048 B2
(45) Date of Patent: *Feb. 3, 2026

(54) METHOD AND APPARATUS FOR DISARMING A SECURITY SYSTEM

(71) Applicant: Universal Electronics Inc., Scottsdale, AZ (US)

(72) Inventors: Kenneth Sweeney, Carlsbad, CA (US); Thomas Thibault, Carlsbad, CA (US); Thomas Henley, Carlsbad, CA (US); Louis Hughes, Carlsbad, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/590,645

(22) Filed: Feb. 28, 2024

(65) Prior Publication Data

US 2024/0203232 A1 Jun. 20, 2024

Related U.S. Application Data

(60) Division of application No. 17/672,473, filed on Feb. 15, 2022, now Pat. No. 11,948,448, which is a division of application No. 16/919,694, filed on Jul. 2, 2020, now Pat. No. 11,270,573, which is a division of application No. 15/997,245, filed on Jun. 4, 2018, now Pat. No. 10,706,713, which is a continuation of (Continued)

(51) Int. Cl.

| | |
|---|---|
| ***G08B 25/00*** | (2006.01) |
| ***G08B 25/08*** | (2006.01) |
| ***G08B 25/10*** | (2006.01) |

(52) U.S. Cl.

CPC .......... *G08B 25/008* (2013.01); *G08B 25/08* (2013.01); *G08B 25/10* (2013.01)

(58) Field of Classification Search

CPC ....... G08B 25/008; G08B 25/08; G08B 25/10

See application file for complete search history.

(56) References Cited

U.S. PATENT DOCUMENTS

| | | | |
|---|---|---|---|
| 6,593,856 | B1 | 7/2003 | Madau |
| 9,633,548 | B2 | 4/2017 | Sager |
| 2005/0128068 | A1 | 6/2005 | Winick |

(Continued)

FOREIGN PATENT DOCUMENTS

| | | | |
|---|---|---|---|
| FR | 3040817 | A1 | 4/2021 |
| WO | 2014145913 | A1 | 9/2014 |
| WO | 2016034949 | A2 | 3/2016 |

OTHER PUBLICATIONS

Examination Report issued in Appl. No. 17810761.1, 5 pgs.

(Continued)

*Primary Examiner* — Omeed Alizada

(74) *Attorney, Agent, or Firm* — Greenberg Traurig, LLP

(57) ABSTRACT

Methods and apparatus are described for automatically disarming a security system. For example, a method for automatically disarming a security system is described, comprising determining, by a personal communication device, when a person is in proximity to the person's home or business and, in response to determining that the person is in proximity to the person's home or business, transmitting a disarm command by the personal communication device to a security controller for the security controller to disarm the security system.

12 Claims, 6 Drawing Sheets

Related U.S. Application Data application No. 15/175,559, filed on Jun. 7, 2016, now Pat. No. 9,997,054.

(56) References Cited

U.S. PATENT DOCUMENTS

| | | | | |
|---|---|---|---|---|
| 2007/0198850 | A1 | 8/2007 | Martin | |
| 2008/0100448 | A1 | 5/2008 | Sharma | |
| 2015/0188725 | A1 | 7/2015 | Coles | |
| 2015/0365787 | A1* | 12/2015 | Farrell | H04W 4/08 455/456.1 |
| 2016/0055698 | A1* | 2/2016 | Gudmundsson | G07C 9/32 340/5.52 |
| 2016/0189528 | A1 | 6/2016 | Lee | |
| 2017/0084143 | A1 | 3/2017 | Acera | |
| 2017/0098367 | A1 | 4/2017 | M | |
| 2017/0111787 | A1 | 4/2017 | Call | |
| 2017/0243472 | A1* | 8/2017 | Davies | H04L 67/12 |

OTHER PUBLICATIONS

Extended European Search Report issued on European patent application No. 17810761.1, dated Jan. 15, 2020, 9 pages.

International Search Report and Written Opinion issued on PCT application No. US17/35706, dated Jun. 21, 2017, 13 pages.

* cited by examiner

METHOD AND APPARATUS FOR DISARMING A SECURITY SYSTEM

I. CROSS-REFERENCE TO RELATED APPLICATIONS

This application is a divisional of U.S. patent application Ser. No. 17/672,473, filed on Feb. 15, 2022, which is a divisional of U.S. patent application Ser. No. 16/919,694, filed on Jul. 2, 2020, now U.S. Pat. No. 11,270,573, which is a divisional of U.S. patent application Ser. No. 15/997,245, filed on Jun. 4, 2018, now U.S. Pat. No. 10,706,713, which is a continuation of U.S. patent application Ser. No. 15/175,559, filed on Jun. 7, 2016, now U.S. Pat. No. 9,997,054, the entirety of each incorporated herein.

BACKGROUND

II. Field of Use

The present application relates to the field of home security. More specifically, the present application relates to automatically disarming home or business security systems upon arrival by authorized persons.

III. Description of the Related Art

Security systems for homes and businesses have been around for many years. Typically, such systems comprise a central security panel or gateway located inside homes or businesses, which monitor various sensors distributed throughout such a home or business. Examples of such sensors include door/window sensors, motion sensors, tilt sensors, glass breakage detectors, etc. When an intrusion is detected by one of these sensors, the central security panel is notified and the central security panel may cause a loud siren to sound or to contact a remote monitoring facility so that the proper authorities may be summoned.

Home security systems are typically armed using a keypad inside the home or, more recently, via a wireless communication device such as a smartphone or tablet computer. A delay is usually employed, which allows a person to arm the system and exit the premises before the system becomes “active”.

Upon re-entry of the premises when the system is active, a person typically will open a door to enter the premises. A door sensor, typically in the form of a magnet/reed switch combination, sends a signal to the central security panel indicating that a door has been opened. The central security panel, in response, generally allows the person some amount of time, typically 30 seconds, to disarm the system by entering a code into the keypad, which is typically located just inside one or more entry doors of the premises. The central security panel generally provides an indication of the amount of time remaining for the person to correctly enter the proper code in order to disarm the system, such as an intermittent beeping sound that becomes more rapid as the delay expiration time approaches or a display that literally provides a countdown sequence.

This “countdown” indication often creates a sense of urgency and even panic, as persons attempt to silence the countdown indictor by entering the correct code into the keypad. As such, the proper code is often not entered correctly, and the countdown indication expires, resulting in the central control panel performing actions normally taken during a real break-in, such as sounding a loud siren or contacting a remote monitoring facility.

Thus, it would be desirable to avoid such stressful episodes when returning home to an armed security system and allow authorized persons to automatically disarm a security system without having to remember any codes.

SUMMARY

The embodiments described herein relate to methods, systems and apparatus for automatically disarming a security system.

In one embodiment, a method is described, comprising determining, by a personal communication device, when a person is in proximity to the person’s home or business, and in response to determining that the person is in proximity to the person’s home or business, transmitting a disarm command by the personal communication device to a security controller for the security controller to disarm the security system.

In another embodiment, a central security controller is described for automatically disarming a security system associated with a home or a business, comprising, a network interface for sending messages and receiving commands over a local area network associated with the home or the business, a memory for storing processor-executable instructions, and a processor, coupled to the network interface and the memory, for executing the processor-executable instructions that cause the central security controller to receive, by the network interface, a command to disarm the security system, determine, by the processor, whether the command originated from a personal communication device proximate the home or business, and disarm the security system when the command originated from a device proximate to the home or the business.

In yet another embodiment, a personal communication device is described for automatically disarming a security system that monitors a home or a business, comprising, a transceiver for transmitting information to a wireless router in a local area network associated with the home or business, a memory for storing processor-executable instructions, and a processor, coupled to the transceiver and the memory, for executing the processor-executable instructions that causes the personal communication device to determine that the personal communication device is proximate to the home or business, and in response to determining that the personal communication device is proximate to the home or business, transmit a disarm command to the wireless router, the disarm command for disarming the security system by a central security controller in communication with the wireless router.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to various embodiments of methods, apparatus and systems to automatically disarm a security system when an authorized person, such as an owner or resident of a home or an owner or employee of a business, returns to the person's home or business. In one embodiment, a security system is disarmed automatically by a mobile communication device carried by an authorized person when the mobile communication device determines that the person is in proximity to the person's home or business. In another embodiment, a server determines when a mobile communication device is in proximity to a home or business, then automatically disarms the security system. In yet another embodiment, a sensor determines when an authorized person is in proximity of a home or business and in response, a query is sent to a mobile communication device requesting a user of the mobile communication device to disarm a security system. Other embodiments are also described.

Figure 1:
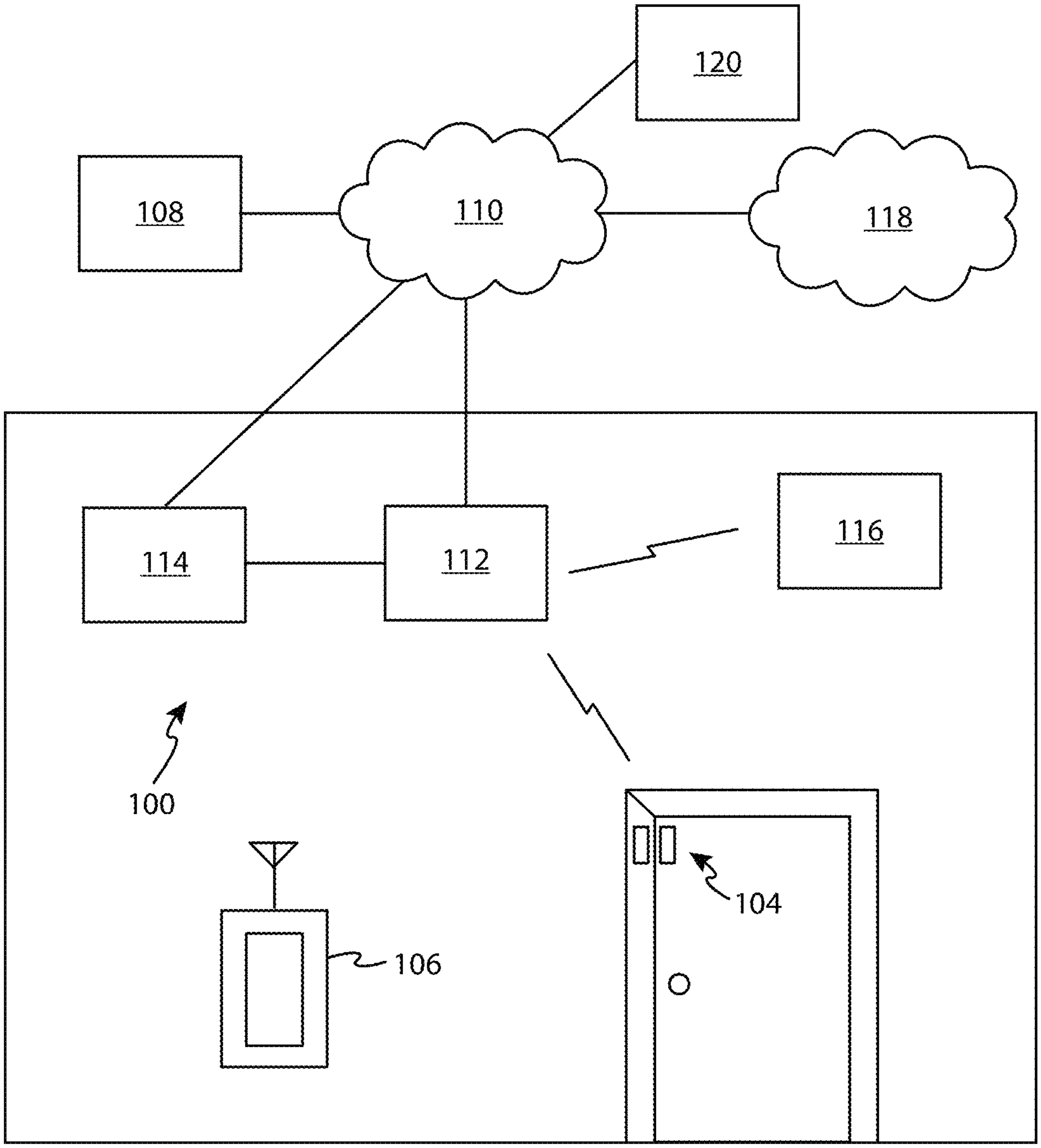
FIG. 1 is an illustration of one embodiment of a security system in accordance with the teachings herein.

FIG. 1 is an illustration of one embodiment of a security system 100 monitoring premises 102 in accordance with the teachings herein, comprising door sensor 104, personal communication device 106, remote monitoring facility 108, wide-area network 110, central security controller 112, router/modem 114, keypad 116, cellular network 118, and server 120. Although only one sensor 104 is shown in FIG. 1, in practice a number of sensors are typically installed throughout premises 102 in order to detect "events" that may occur at premises 102, such as a door or window being opened, movement or sound within premises 102, the presence of smoke, fire, or carbon monoxide, freezing, flooding, a light being turned on or off, a medical emergency (such as a fall, an irregular heartbeat, low blood sugar, etc.), or other occurrence or condition that might be of interest to a home owner or other interested party.

Security system 100 may be activated, or "armed", when a person leaves premises 102. Typically, the person will enter a code or other indication into keypad 116, which alerts central security controller 112 of the person's desire to arm the system. Central security controller 112 typically allows a "grace period", for example 30 seconds, for the person to leave premises 102, whereupon security system 100 becomes "active" and will take one or more prescribed actions if an event occurs as detected by one of the sensors.

When one of the sensors detects an event, a signal is transmitted to central security controller 112 by the sensor that detected the event and, in response, central security controller 112 may perform one or more actions, such as activate one or more lights and/or sirens in or around the monitored premises, send an alert to central monitoring station 108 via router/modem 114 and wide area network 110 (and/or by some other means such as a POTS telephone network), and/or notify one or more persons, via email, text message, phone call, etc. of the detected event.

In another embodiment, central security controller 112 is replaced by a "hub" or "gateway" specifically configured to monitor the sensors and provide notifications of events to central monitoring station 108 and/or individuals via text, email, phone calls, etc. Such "DIY" security systems have been gaining in popularity recently, as they typically do not require professional monitoring services and an associated monthly monitoring fec. Typically, such a hub or gateway sends text message alerts to one or more smartphones, for example, when an event occurs as determined by one of the sensors. Throughout this application, it is assumed that referencing central security controller 112 is synonymous with referencing such a hub or gateway in the alternative.

When personal communication device 106 receives the alert message from central security controller 112, an indication is generated and provided to a user of personal communication device 106. The indication alerts the user of the fact that one of the sensors 104 has detected an event. The user may respond to the indication by operating personal communication device 106 via a user interface, such as a touchscreen device, one or more push-buttons, a microphone, an accelerometer, gyroscope, or other motion-sensitive device. For example, the indication from personal communication device 106 may comprise a ringtone, vibration, light, text message, phone call, or email message, or a combination of two or more of these. In response, the user may simply acknowledge receipt of the signal by touching the touchscreen device, pressing an icon on the touchscreen device, pressing a button, speaking into a microphone, or simply shaking personal communication device 106 in a predefined manner understood.

One problem in prior-art security systems is disarming the system. When a person arrives home to an armed security system and opens a door to enter premises 102, sensor 104 alerts security controller 112 of the door opening and, in response, security controller 112 begins a countdown timer to allow the person to disarm the system by entering a code into keypad 116, which is typically located just inside an entry door. Keypad 116 generally provides an indication of the amount of time remaining for the person to correctly enter the proper code in order to disarm the system, such as an intermittent beeping sound that becomes more rapid as the expiration time of the countdown timer approaches.

This "countdown" indication often creates a sense of urgency for anyone attempting to disarm the security system. This often creates a feeling of urgency and even panic, as the person attempts to silence the countdown indictor by entering the correct code into keypad 116. As such, the proper code is often forgotten, and the countdown indication further exacerbates the perceived urgency to enter the proper code before expiration of the allotted delay time period. This results in the central control panel performing actions normally taken during a real break-in, such as sounding a loud siren or contacting remote monitoring facility 108.

The embodiments disclosed herein avoid the above-described problem of disarming security system 100. In one embodiment, when a person arrives at the person's home or business, personal communication device 106 detects that the person is in proximity to the person's home or business and, in turn, transmits a command to security controller 112 for security controller 112 to disarm security system 100. In one embodiment, personal communication device 106 determines that the person is in proximity of the person's home or business by detecting that personal communication device 106 is within range of a wireless local area network, for example, within range of router/modem 114. "In proximity" also means physical proximate to any device within range of wireless router/modem 114, such as central security controller 112. Router/modem 114 comprises a wireless router that is commonly found in homes and businesses that provides wireless communications between various devices within range of router/modem 114 and wide area network 110. Router/modem 114 typically broadcasts an indication of its presence via a well-known SSID code. Personal communication device 106, having previously registered with wireless router/modem 114, detects this code upon arrival to an authorized person's home or business where router/modem 114 is located, and uses the SSID to automatically connect to the wireless local area network provided by router/modem 114. Once connected, personal communication device 106 transmits a disarm command to router/modem 114, addressed to security controller 112 so that security controller 112 can disable security system 100. At security controller 112, when the disarm command is received, it is evaluated to determine whether the command originated from a personal communication device within range of the local area network, i.e., within range of router/modem 114. If so, then security controller 112 disarms security system 100, i.e., does not take the prescribed action(s) when one of the sensors indicates an occurrence of an event, i.e., ignores event indications from the sensors.

Figure 2:
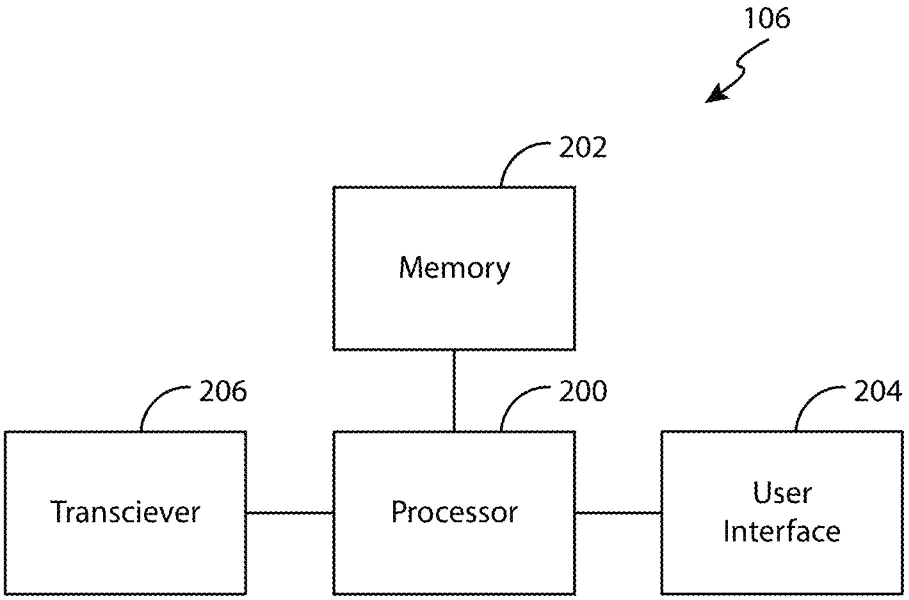
FIG. 2 is a functional block diagram of one embodiment of a personal communication device used to execute an application for automatically disarming the security system as shown in FIG. 1.

FIG. 2 is a functional block diagram of one embodiment of personal communication device 106, showing processor 200, memory 202, user interface 204, and one or more transceivers 206. It should be understood that the functional blocks shown in FIG. 2 may be connected to one another in a variety of ways, and that not all functional blocks necessary for operation of personal communication device 106 are shown (such as a power supply), for purposes of clarity.

Personal communication device 106 comprises virtually any electronic computing device capable of sending and receiving information over a local area network. Examples of personal communication device 106 include smartphones, tablet computers, personal digital assistants, wearables, laptop computers or other devices capable of wireless communications with router/modem 114.

Processor 200 is configured to provide general operation of personal communication device 106 by executing processor-executable instructions stored in memory 200, for example, executable code. Processor 200 typically comprises one or more microprocessors, microcontrollers, and/or custom ASICs that provide communications functionality to personal communication device 106 as well as to execute instructions that interact with security controller 112 for purposes of automatically disarming security system 100 when a person arrives at the person's home or business.

Memory 202 comprises one or more non-transient information storage devices, otherwise referred to as one or more processor-readable mediums, such as RAM, ROM, flash memory, SD memory, XD memory, or virtually any other type of electronic, optical, or mechanical memory device suitable for, generally, a portable electronic processing platform. Memory 202 is used to store the processor-executable instructions for general operation of personal communication device 106 (for example, communication functionality), instructions for determining when a person has arrived at the person's home or business, transmitting a disarm command when personal communication device 106 determines that the person has arrived at the person's home or business, and data for identifying a local area network associated with the person's home or business.

User interface 204 is coupled to processor 200 and allows a user to receive indications from processor 200 when, for example, an acknowledgement message is received by personal communication device 106 that security system 100 has been automatically disarmed. User interface 200 may comprise one or more pushbuttons, touchscreen devices, electronic display devices, lights, LEDs, LCDs, biometric readers, switches, sensors, keypads, microphones, speakers, and/or other human interface devices that present indications to a user or generate electronic signals for use by processor 200 upon initiation by a user. A very popular user interface device today is a touchscreen device.

Transceiver 206 comprises circuitry necessary to wirelessly transmit and receive information to/from router/modem 114, such as a Wi-Fi transceiver, a Bluetooth transceiver. In some embodiments, more than one transceiver is present, for example, a cellular transceiver and a Wi-Fi transceiver. Transceiver 206 can, additionally, comprise circuitry to communicate with cellular networks, such as cellular network 118. Such circuitry is generally well known in the art.

Figure 3:
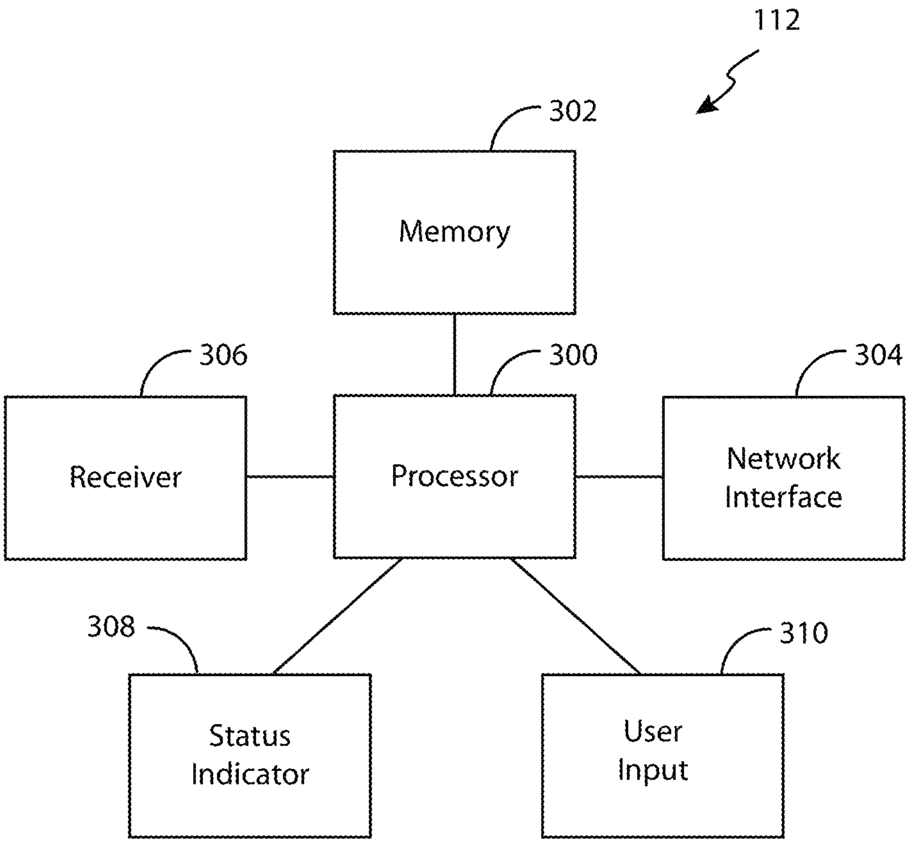
FIG. 3 is a functional block diagram of one embodiment of a central security controller as shown in FIG. 1.

FIG. 3 illustrates a functional block diagram of central security controller 112. Specifically, FIG. 3 shows processor 300, memory 302, network interface 304, receiver (or transceiver) 306, optional status indicator 308, and optional user input 310. It should be understood that not all of the functional blocks shown in FIG. 3 are required for operation of central security controller 112 (for example, status indicator 308 and/or user input 310), that the functional blocks may be connected to one another in a variety of ways other than what is shown in FIG. 3, and that not all functional blocks necessary for operation of central security controller 112 are shown (such as a power supply), for purposes of clarity.

Processor 300 is configured to provide general operation of central security controller 112 by executing processor-executable instructions stored in memory 302, for example, executable computer code. Processor 300 typically comprises a general purpose microprocessor or microcontroller, manufactured by well-known companies such as Intel Corporation of Santa Clara, California, Atmel of San Jose, California, and STMicroelectronics based in Geneva, Switzerland.

Memory 302 comprises one or more information storage devices, such as RAM, ROM, EEPROM, UVPROM, flash memory, SD memory, XD memory, or other type of electronic, optical, or mechanical information storage device. Memory 302 is used to store the processor-executable instructions for operation of central security controller 112 as well as any information used by processor 300, such as information pertaining to the number, type, location, serial number, etc. of sensors in security system 100, identification information of central security controller 112, such as a serial number, contact information pertaining to remote monitoring station 108, users, owners, and/or occupants of premises 102, various door and window status information (e.g., "open", "closed", times when a door or window was opened or closed), and/or other information.

Network interface 304 comprises circuitry necessary for central security controller 112 to communicate with remote devices/entities, such as router/modem 114 and/or directly with remote monitoring facility 108 and/or personal communication device 106. Such circuitry comprises one or more of a T1/T3 interface circuitry, Ethernet circuitry, and/or wireless communication circuitry, all of which is well-known in the art.

Receiver 306 comprises circuitry necessary to wirelessly receive electronic signals from the sensors and keypad 116, either wirelessly and/or by wired means. Such circuitry is well known in the art and may comprise BlueTooth, Wi-Fi, RF, optical, and ultrasonic circuitry, telephone wiring, twisted pair, two-conductor pair, CAT wiring, AC power wires, or other type of wiring. In one embodiment, receiver 306 is replaced by a transceiver, for allowing two-way communication between central security controller 112 and the sensors and/or other devices, such as home automation and control devices.

Optional status indicator 308 is used to convey the status of one or more sensors, a particular "zone" of premises 102, and/or security system 100 in general. Status indicator 308 may comprise one or more LEDs, LCDs, seven segment displays, electronic displays, or any other device for providing a visual status, and/or it may comprise a device capable of emitting audible tones, messages, alerts, etc., that also indicates one or more statuses.

Optional user interface 310 comprises hardware and/or circuitry for allowing a user to interact with central security controller 112. For example, a user may arm or disarm security system 100, typically by pushing one or more keys of a keypad that comprises user input 310. Security systems typically operate in at least three modes, an "armed-away" mode, an "armed-home", and an unarmed mode. The armed-away mode typically causes central security controller 112 to perform one or more actions when an alarm signal is received from any one sensor, including door/window sensors or motion sensors. The armed-home mode typically causes central security controller 112 to perform one or more actions only when an alarm signal from a sensor is received. In other words, alarm signals generated by motion sensors and other occupancy sensors (such as thermal detectors or floor pressure sensors) are ignored by central security controller 112. The unarmed mode generally causes central security controller 112 to ignore any alarm signal received from any sensor.

Figure 4:
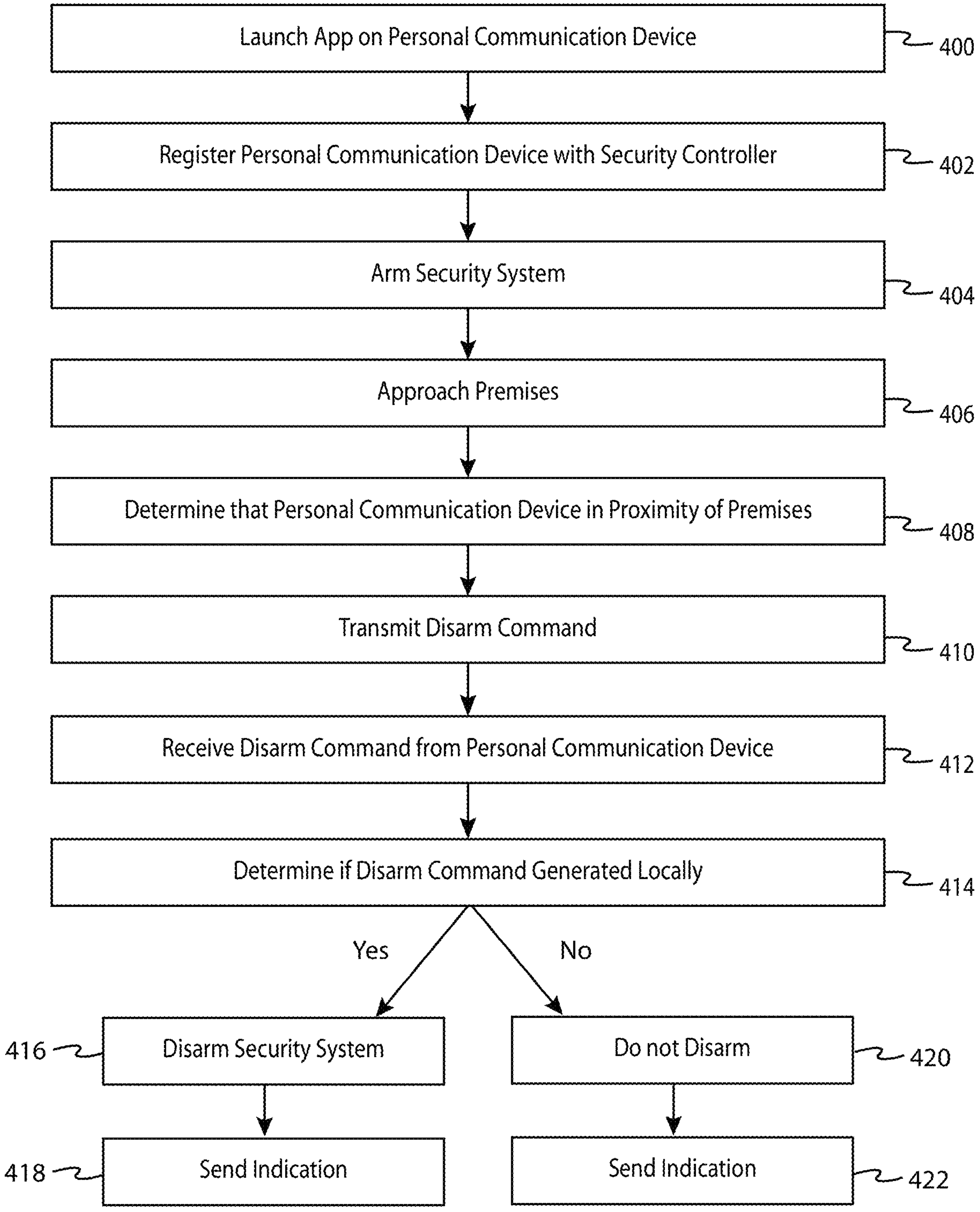
FIG. 4 is a flow diagram illustrating one embodiment of a method for automatically disarming the security system shown in FIG. 1.

FIG. 4 is a flow diagram illustrating one embodiment of a method for automatically disarming a security system, performed by personal communication device 106 as it executes code stored in its memory 202. It should be understood that in some embodiments, not all of the steps shown in FIG. 4 are performed. It should also be understood that the order in which the steps are carried out may be different in other embodiments.

At block 400, a user of personal communication device 106 launches a software application, or "app" stored in memory 202 of personal communication device 106. The app may allow users to interact with central security controller 112, for example to arm and disarm security system 100, for receiving text message alerts when an alarm condition is determined by security system 100, for receiving still or video images from cameras disposed throughout premises 102, etc. The app may further provide for automatic disarming of security system 100.

In one embodiment, the app allows a user to select a local area network associated with the user's home or business. Personal communication device 106 may display a list of detected local area networks to the user, as personal communication device 106 receives an SSID of each available local area network. The user selects one or more local area networks, and an indication of the selected network(s) is/are stored in memory 302. In another embodiment, the software app automatically adds the SSID of a local area network within range of personal communication device 106, i.e., a local area network that is detectable by its SSID by personal communication device 106. In another embodiment, the app automatically adds the SSID of any local area network that personal communication device 106 had previously registered with.

At block 402, the user may additionally register personal communication device 106 with security controller 112 for use in one embodiment, described later herein. The registration process comprises registration, by a device such as personal communication device 106, prior to a device being permitted to automatically disarm security system 100. A device may become authorized during the pre-registration process, by providing identification information of the device to security controller 112. For example, a device may communicate with security controller 112 via a website associated with security controller 112 or directly with security controller 112 via the local area network, allowing a user of security system 100 to provide a MAC address, mobile phone number, email address, etc., to security controller 112, where it is stored by processor 300 in memory 302, for later use in identifying authorized devices. In one embodiment, security controller 112 transmits an identification code to the registering device, for storage in memory 202. Thereafter, the personal communication device 106 transmits its identification information to security controller 112 each time that the device enters a communication range of a local area network associated with the user's home or business.

At block 404, the user leaves the user's home or business, arming security system 100 via traditional methods, such as entering a code into keypad 116 or into personal communication device 106, via the app, or some other software application resident on personal communication device 106, for transmitting an "arm" code to security system 100.

At some time later, at block 406, the user approaches the user's home or business while security system 100 is armed, meaning that security controller 112 will take one or more predetermined actions when a door or window is opened, or when an occupancy sensor determines that movement has occurred within premises 102. The person carries personal communication device 106, in this example, a smartphone having the software application, previously described, stored within memory 202, for automatically transmitting a disarm command to security controller 112 when personal communication device 106 determines that the person is in proximity of the person's home or business.

At block 408, personal communication device 106 determines that the person is in proximity of the person's home or business. In one embodiment, this is achieved when personal communication device 106 detects that it is within range of wireless router/modem 114. In one embodiment, personal communication device 106 detects that it is within range of wireless router/modem 114 when it detects an SSID code that is broadcast by wireless router/modem 114. Personal communication device 106 may automatically join the local area network in order to use wireless router/modem to communicate with wide area network 110 and/or other devices registered with wireless router/modem 114, such as security controller 112. Typically, a MAC address associated with personal communication device 106 is provided to wireless router/modem 114 during registration with wireless router/modem 114, and a local area IP address is assigned by a DHCP server running on wireless router/modem 114. The DHCP server typically maintains an association between the assigned IP address and the MAC address. In another embodiment, personal communication device 106 determines that the person is in proximity of the person's home or business using position-determination technology, such as A-GPS (assisted GPS), Wi-Fi, and/or cellular network mapping, all of which are well-known in the art. In yet another embodiment, a detector located on or within premises 102 can detect the presence of personal communication device 106 using, for example, RFID technology.

At block 410, in response to determining that the person is in proximity of the person's home or business, personal communication device 106 transmits a disarm command to wireless router/modem 114, destined for security controller 112. The disarm command is generated by processor 300 and provided to transmitter 206, where it is sent to wireless router/modem 114 over the local area network. The disarm command is typically encapsulated in one or more data packets, for example data packets in accordance with the well-known TCP/IP protocol, for transmission over the local area network. As such, the disarm command typically comprises a source address assigned to personal communication device 106 by wireless router/modem 114. The source address typically comprises a "private" IPv4 address in TCP/IP networks, for example, "192.168.X.X".

In another embodiment, the disarm command is not sent over the local area network. In this embodiment, the disarm command is sent over wide-area wireless data network, such as cellular data network 118 after personal communication device 106 determines that it is proximate to the user's home or business, as determined as described above, by sensing a known SSID associated with the user's home or business, or by some other means, such as by receiving a code from a component of security system 100. For example, in one embodiment, keypad 116 may be configured to emit a wireless code in one of a variety of wireless formats, such as Bluetooth, Wi-Fi, RFID, etc., similar or the same as an SSID. In another embodiment, an RFID chip may be embedded into the entry door, door lock or somewhere else nearby such that when personal communication device 106 is proximate to the RFID chip, a code embedded onto the RFID chip is detected and compared to a code stored in memory. If a match is found, or when personal communication device 106 is within range of the wireless signal emitted by keypad 116, communication device 106 transmits a disarm command over cellular network 118. Cellular network 118, in turn, provides the disarm command to wide-area network 110, and then on to wireless router/modem 114, where it is finally routed to security controller 112.

At block 412, security controller 112 receives the disarm command sent by personal communication device 106.

In one embodiment, the disarm command is received before an entry door is opened. In this embodiment, personal communication device 106 is able to detect the local area network or a code provided by an RFID chip or other source, and, in response, transmit the disarm command prior to the entry door being opened. If the disarm command is accepted by security controller 112, security controller 112 does not cause a countdown sequence to occur at keypad 116, i.e., no beeping sounds are emitted by keypad 116 to remind the use to disarm security system 100 as security system 100 has already been automatically disarmed. In a related embodiment, after a successful disarm of security system 100 as just described, security controller 112 detects that the entry door has been opened by door sensor 104 and, in response, provides an indication to keypad 116 that the system has already been disarmed. For example, in response to the entry door being opened after security system 100 has been disarmed, security controller 112 may cause keypad 116 to emit a "cheerful" sound, such as a "chime" and/or display a color indicative of security system being disarmed, such as a display being illuminated in a green light.

When the disarm command from personal communication device 106 is not received by security controller 112 prior to the entry door being opened, security controller 112 typically causes keypad 116 to begin a countdown timer to remind the user to enter a disarm code into keypad 116 before the countdown timer expires. The countdown timer typically comprises a 30 second time period for the user to enter a correct disarm code into keypad 116. Failure to do so generally results in security controller 112 taking one or more predetermined actions, such as sounding a local alarm signal, illuminating lights, and/or alerting remote monitoring station 112 that an alarm condition has occurred. However, if personal communication device 106 discovers that it is in proximity to the user's home or business, as described in any of the embodiments above, personal communication device 106 transmits a disarm command to security controller 112, and security controller 112 terminates the countdown timer when the disarm command is accepted. Security controller 112 may additionally provide an indication to keypad 116 that the system has been disarmed, as described above.

At block 414, processor 300 receives the disarm command and evaluates it to determine whether or not the disarm command originated proximate to the user's home or business, i.e., within range of wireless router/modem 114. In one embodiment, processor 300 determines that the disarm command originated from a device proximate to a user's home or business by determining whether at least a portion of a source address in the disarm command matches at least a portion of the local network address, as provided by wireless router/modem 114 to security controller 112 after security controller 112 registers with wireless router/modem 114. When security controller 112 registers with wireless router/modem 114, security controller 112 typically provides its MAC address to wireless router/modem 114 and the DHCP server running on wireless router/modem 114 assigns a local area IP address to security controller 112, for example 192.168.1.45. The DHCP server typically maintains an association between the assigned IP address and the MAC address. Processor 300 determines a subnet of the local area network by applying a subnet mask to the IP address assigned to security controller 112 by wireless router/modem 114. A typical subnet mask is 255.255.255.0. Thus, the subnet of the local area network is derived by processor 300 by applying the subnet mask to the IP address assigned by wireless router/modem 114, in this case 192.168.1.45, which yields a subnet of 192.168.1. When processor 300 receives the disarm command from network interface 304, it applies the subnet mask to the source address in the packets containing the disarm command to yield a subnet of the source device that sent the disarm command. For example, if personal communication device 106 was assigned an IP address of 192.168.1.32 by wireless router/modem 114, and this address is provided to security controller 112 as part of a disarm command, processor 300 applies the subnet mask to the source IP address in the disarm command to arrive at a subnet of 192.168.1.

In other embodiments, processor 300 determines that personal communication device 106 is proximate to the user's home or business by evaluating location information associated with the disarm command. For example, in one embodiment, personal communication device 106 determines that it is within a predetermined distance from the user's home or business, such as within 20 feet. This is accomplished using any number of location-based technologies known in the art. The software app on personal communication device 106 allows the user to specify the user's home or business, either by entering an address into the app, or providing an indication when personal communication device 106 is at the user's home or business. The location of the user's home or business address is stored in memory 302 and is later used in a comparison to location data associated with the disarm command. For example, in one embodiment, the software app may be configured to transmit GPS coordinates when a disarm command is transmitted, allowing security controller 112 to compare that location with the one stored in memory. If a match is determined, security controller 112 determines that personal communication device 106 is proximate to the user's home or business.

In another embodiment, security controller 112 determines that personal communication device 106 is proximate to the user's home or business by evaluating a code transmitted by personal communication device 106 when personal communication device 106 acquires a code provided by a device within/on the user's home or business. As described earlier, such a code could be provided by an RFID chip located near an entry door of premises 102, or it may be provided by a device inside premises 102, such as keypad 116. In any case, the disarm command transmitted by personal communication device 106 comprises this code, which is compared by processor 300 to a code stored in memory to determine if personal communication device 106 is proximate to the user's home or business.

In one embodiment, the code described above comprises a MAC code provided by wireless router/modem 114. In this embodiment, security controller 112 receives a MAC address of each personal communication device that registers with security controller 112, as described above at block 402, and stores one or more of these MAC addresses in memory 302. When a disarm command is received by the central security controller 112, the MAC address of the personal communication device that transmitted the disarm command is provided to central security controller 112 upon receipt of the disarm command from a personal communication device. Then, processor 300 compares the received MAC address associated with the disarm command to one or more MAC addresses stored in memory 302 to determine if a match is found, indicating that the disarm command originated from an authorized personal communication device.

In any case, at block 416, when security controller 112 determines that the disarm command originated from a device within range of wireless router/modem 114, processor 300 disarms security system 100 by ignoring alarm signals transmitted to security controller 112 from any of the monitored sensors.

In another embodiment, processor 300 additionally determines whether the device within range of the local area network is an "authorized" device to control operation of security system 100. Thus, not only does a device need to transmit the disarm command locally over the local network in order to automatically disarm security system 100, but it must also be deemed an authorized device by security controller 112.

In one embodiment, processor 300 determines whether the device that sent the disarm command is authorized by using a pre-registration process. In this embodiment, when the disarm command is received, processor 300 compares an identification code sent as part of the disarm command with an identification code stored in memory as a result of the registration process described in block 402. When the identification code associated with the disarm command matches the identification code stored in memory 302, processor 300 causes security controller 112 to disarm security system 100. The registration process is described at block 402, above.

At block 418, processor 300 may cause an indication to be transmitted, alerting one or more users that security system 100 has been disarmed. In one embodiment, an indication is sent to keypad 116, which may emit a friendly "chime" or otherwise indicate that security system 100 has been disarmed. Alternatively, or in addition, processor 300 may provide a signal to one or more personal communication devices, indicating that security system 100 has been disarmed. In one embodiment, only the personal communication device 106 that sent the disarm command is notified. In another embodiment, two or more personal communication devices are notified, for example, any personal communication device that has been registered with security controller 112 as described above at block 402. The notification may comprise a date and time that security system 100 was disarmed, and an identification of the particular personal communication device that caused security system 100 to become disarmed.

At block 420, when the disarm command is found to be not from originating from a device within range or router/modem 114, processor 300 does not cause security controller 112 to disarm security system 100. In an alternative embodiment, when either the subnet of the source address of the disarm command does not match the subnet of the local area network (or the subnet of the IP address assigned to security controller 112) or the identification code associated with the disarm command does not match the identification code stored in memory 302, processor 300 does not cause security controller 112 to disarm security system 100.

At block 422, when security system 100 is not disarmed as described by block 414, processor 300 may generate a message for transmission to the source device of the disarm command, indicating that security system 100 was not disarmed.

Figure 5:
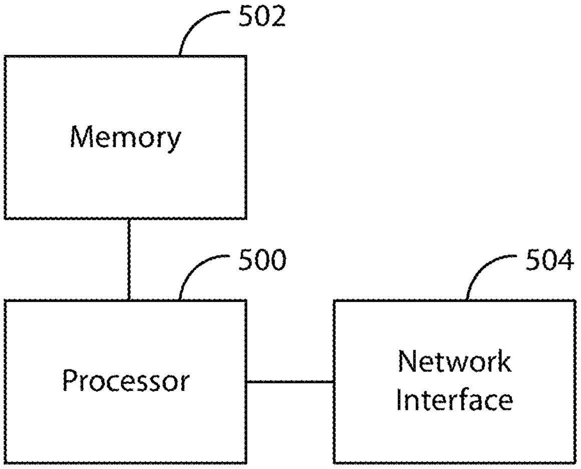
FIG. 5 is a functional block diagram of the server shown in FIG. 1, used in another embodiment for automatically disarming the security system shown in FIG. 1.

FIG. 5 is a functional block diagram of server 120, used in another embodiment for automatically disarming security system 100. In this embodiment, server 120 determines a location of an authorized person, then disarms security system 100 when server 120 determines that the authorized person is in proximity to the person's home or business. Thus, server 120, in this embodiment, also acts as a centralized controller for security system 100. It should be understood that some of server 120's functional elements have been omitted because they are well-known in the art, such as a user interface, power supply, etc.

Server 120 comprises processor 500, memory 502, and network interface 504. Processor 500 is configured to provide general operation of server 120 by executing processor-executable instructions stored in memory 502, for example, executable computer code. Processor 500 typically comprises a general purpose microprocessor or microcontroller, manufactured by well-known companies such as Intel Corporation of Santa Clara, California, Atmel of San Jose, California, and STMicroelectronics based in Geneva, Switzerland.

Memory 502 comprises one or more information storage devices, such as RAM, ROM, EEPROM, UVPROM, flash memory, SD memory, XD memory, or other type of electronic, optical, or mechanical information storage device. Memory 502 is used to store processor-executable instructions for operation of server 120, as well as any information used by processor 500, such as account information pertaining to a large number of security systems, status information of such systems (i.e., "armed", "disarmed", door or window open/closed locked/unlocked states, etc.), user information, billing information and/or other information.

Network interface 504 comprises circuitry necessary for server 120 to communicate with central security controller 112 and personal communication device 106 via wide area network 110 and/or cellular network 118. Such circuitry comprises one or more of a T1/T3 interface circuitry, Ethernet circuitry, and/or wireless communication circuitry, all of which is well-known in the art.

Figure 6:
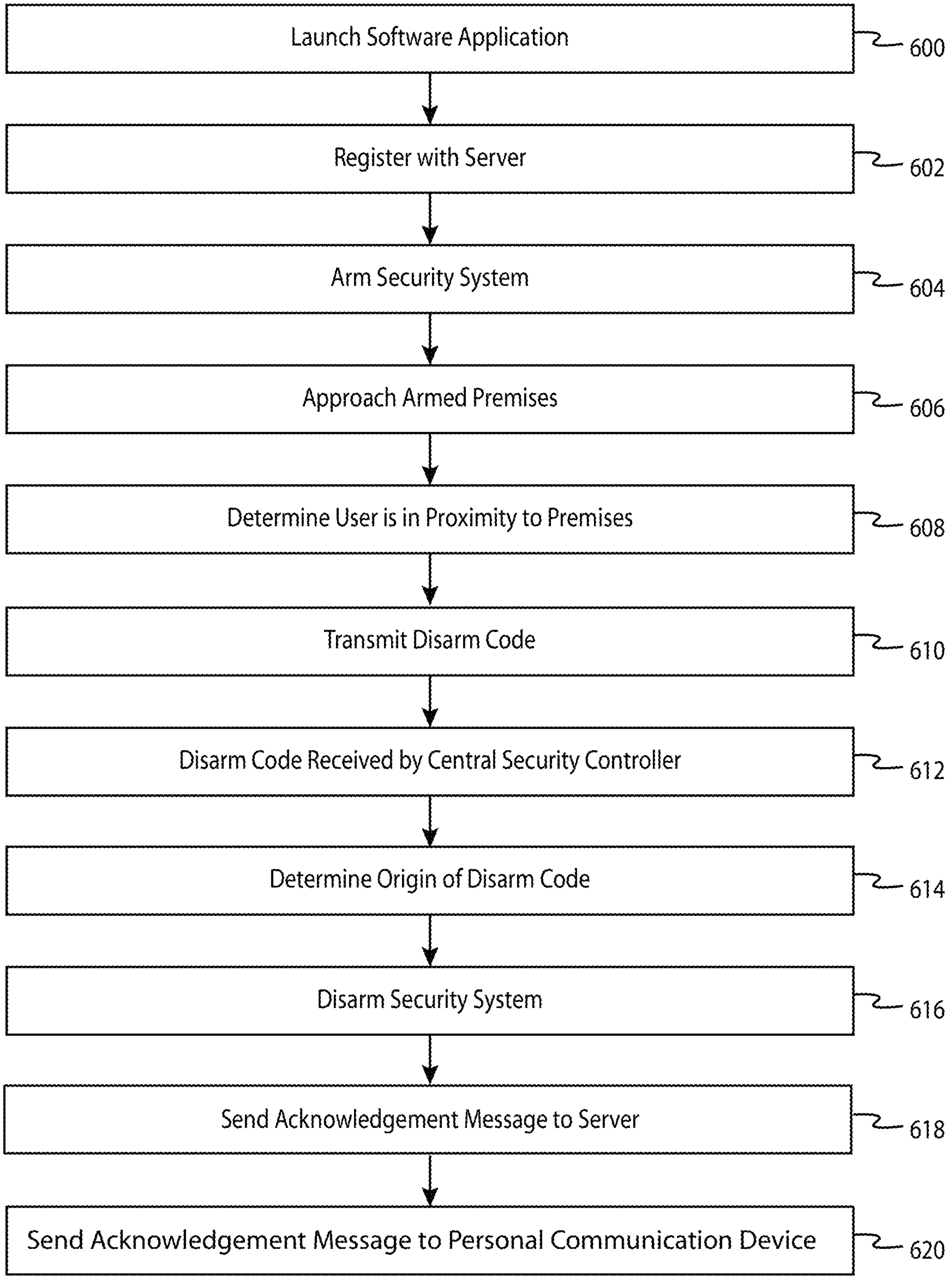
FIG. 6 is a flow diagram illustrating the embodiment illustrated in FIG. 5 for automatically disarming a security system.

FIG. 6 is a flow diagram illustrating this embodiment, performed by server 120 as processor 500 executes code stored in its memory 502. It should be understood that in some embodiments, not all of the steps shown in FIG. 6 are performed. It should also be understood that the order in which the steps are carried out may be different in other embodiments.

At block 600, a user of personal communication device 106 launches a software application, or "app" stored in memory 202 of personal communication device 106. The app may allow users to interact with server 120, for example to arm and disarm security system 100, for receiving text message alerts when an alarm condition is determined by security system 100, for receiving still or video images from cameras disposed throughout premises 102, etc.

In one embodiment, the app allows a user to select a local area network associated with the user's home or business. Personal communication device 106 may display a list of detected local area networks to the user, as personal communication device 106 receives an SSID of each available local area network. The user selects one or more local area networks, and an indication of the selected network(s) is/are stored in memory 302. In another embodiment, the software app automatically adds the SSID of a local area network within range of personal communication device 106, i.e., a local area network that is detectable by its SSID by personal communication device 106. In another embodiment, the app automatically adds the SSID of any local area network that personal communication device 106 had previously registered with.

At block 602, the user registers with server 120 so that server 120 can automatically disarm security system 100. The user may provide server 120 with information pertaining to the user, security system 100 and/or personal communication device 106. Such information may comprise a user name, user address, user phone number, serial numbers of various components of security system 100, a MAC or IP address of personal communication device 106, location information pertaining to the user's home or business, such as GPS or other location coordinates, etc. Server 120 associates security system 100 and, specifically, central security controller 112 with personal communication device 106 and stores the association in memory 502.

At block 604, the user leaves the user's home or business, arming security system 100 via traditional methods, such as entering a code into keypad 116 or into personal communication device 106, which may transmit a message over wide area network 110 and/or cellular network 118, for server 120 to arm security system 100. In an embodiment where server 120 provides control of security system 100, server 120, in response, sends an arm command to central security controller 112 for central security controller 112 to arm security system 100.

At some time later, at block 606, the user approaches the user's home or business while security system 100 is armed. The user carries personal communication device 106, in this example, a smartphone having the software application, previously described, stored within memory 202.

At block 608, server 120 determines that the user is in proximity of the user's home or business. In one embodiment, this is achieved when personal communication device 106 detects that it is proximate to the user's home or business, in any of the ways described with respect to the method of FIG. 4. Personal communication device 106 transmits a signal to serve 120 and server 120 determines that the user is in proximity to the user's home or business when server 120 receives this signal from personal communication device 106.

In another embodiment, server 120 determines when the user is in proximity to the user's home or business by determining a location of personal communication device 106. Server 120 may receive periodic updates from personal communication device 106, such as GPS or other positioning information at predetermined time intervals or on a continuous basis. Such information is provided to server 120 via wide area network 110 and/or cellular network 118. Server 120 compares the location of personal communication device 106 to the user's home or business location as stored in memory 502. When personal communication device 106 is within a predetermined distance from the user's home or business, for example 20 feet, serve 120 determines that the user is proximate to the user's home or business.

At a result of determining that the user is proximate to the user's home or business at block 408, at block 610, server 120 transmits a disarm command to central security controller 112 via wide area network 110. The disarm command is pre-stored in memory 502 and is compatible with the make and model of security system 100, as determined by processor 500.

In another embodiment, server 120 determines that personal communication device 106 is proximate to the user's home or business from a second source. For example, when personal communication device 106 is proximate to the user's home or business, central security controller 112 may detect that personal communication device 106 is within range of wireless router/modem 114 when personal communication device 106 automatically joins the local area network. The app running on personal communication device 106 may be configured to communicate with central security controller 112 when it has joined the local area network, similar to how personal communication device 106 transmits a disarm command in the embodiment described by the method of FIG. 4. As such, when central security controller 112 receives an indication from personal communication device 106 that personal communication device 106 is present in the local area network, central security controller 112 may send a message to server 120 indicating that personal communication device 106 is within range of wireless router/modem 114 as a way for server 120 to confirm the location of personal communication device 106 determined at block 608. Only after server 120 receives this confirmation does server 120 send the disarm command. Of course, server 120 could first receive the location confirmation from central security controller 112 and then determine the location of personal communication device 106 for confirmation in another embodiment.

At block 612, security controller 112 receives the disarm command sent by server 120.

In one embodiment, the disarm command is received before an entry door is opened. In this embodiment, server 120 is able to detect proximity of the user to the user's home or business before an entry door is opened and, in response, transmit the disarm command prior to the entry door being opened. If the disarm command is accepted by security controller 112, security controller 112 does not cause a countdown sequence to occur at keypad 116, i.e., no beeping sounds are emitted by keypad 116 to remind the use to disarm security system 100 as security system 100 has already been automatically disarmed. In a related embodiment, after a successful disarm of security system 100 as just described, security controller 112 detects that the entry door has been opened by door sensor 104 and, in response, provides an indication to keypad 116 that the system has already been disarmed. For example, in response to the entry door being opened after security system 100 has been disarmed, security controller 112 may cause keypad 116 to emit a "cheerful" sound, such as a "chime" and/or display a color indicative of security system being disarmed, such as a display being illuminated in a green light.

When the disarm command from server 120 is not received by security controller 112 prior to the entry door being opened, security controller 112 typically causes keypad 116 to begin a countdown timer to remind the user to enter a disarm code into keypad 116 before the countdown timer expires. The countdown timer typically comprises a 30 second time period for the user to enter a correct disarm code into keypad 116. Failure to do so generally results in security controller 112 taking one or more predetermined actions, such as sounding a local alarm signal, illuminating lights, and/or alerting remote monitoring station 112 that an alarm condition has occurred. However, if server 120 discovers that the user, via the user's personal communication device 106, is in proximity to the user's home or business, as described in any of the embodiments above, server 120 transmits a disarm command to security controller 112, and security controller 112 terminates the countdown timer when the disarm command is accepted. Security controller 112 may additionally provide an indication to keypad 116 that the system has been disarmed, as described above.

In any case, at block 614, when security controller 112 receives the disarm command, processor 300 evaluates the disarm command to ensure that the disarm command originated form server 120, using techniques well known in the art such as one of a variety of encryption methods.

In another embodiment, processor 300 additionally determines whether a device that caused server 120 to send the disarm command is an "authorized" device to control operation of security system 100.

In one embodiment, processor 300 determines whether the device that sent the disarm command is authorized by using a pre-registration process. In this embodiment, the disarm command sent by server 120 additionally comprises identification information, such as a MAC address, an IP address, telephone number, MIN, etc., pertaining to the device that caused the disarm command to be sent. When the disarm command is received by central security controller 112, processor 300 compares the identification information to information stored in memory 302 to confirm that an authorized device caused the disarm command to be sent by server 120. The information stored in memory 202 may have been sent as a result of the registration process described in block 402. Alternatively, the information may be transmitted by personal communication device 106 when personal communication device 106 determines that it is in range of wireless router/modem 114. In this embodiment, processor 300 compares the identification information associated with the disarm command with identification information provided by personal communication device 106 via the local area network to confirm that personal communication device 106 is, in fact, at the user's home or business and that a malicious disarm command was not sent. Processor 300 may use any of the aforementioned methods to determine that the identification information from personal communication device 106 originated from a device in range of wireless router/modem 114, and may further use a time that the identification information was received to determine that the comparison is timely, i.e., that when a disarm command is received, identification information from a personal communication device is received via the local area network within a predetermined time period from when the disarm command was received.

In either case, at block 616, processor 300 disarms security system 100 by ignoring alarm signals transmitted to security controller 112 from any of the monitored sensors.

At block 618, an acknowledgement message may be sent by central security controller 112 to server 120, indicating that security system 100 was successfully disarmed or not disarmed, as the case may be.

At block 620, in response to receiving the acknowledgment, server 120 may transmit a status to personal communication device 106, indicating a successful or unsuccessful attempt to disarm security system 100.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method, performed by a personal communication device, for automatically disarming a security system, comprising:

registering with the security system;

in response to registering with the security system, wirelessly receiving a code from the security system;

determining that the personal communication device is in proximity to the security system; and in response to determining that the personal communication device is in proximity to the security system, transmitting a disarm command by the personal communication device to disarm the security system, the disarm command comprising the code.

2. The method of claim 1, wherein determining that the personal communication device is in proximity to the security system comprises determining that the personal communication device is within range of a local area network associated with the security system.

3. The method of claim 1, wherein determining when the personal communication device is in proximity to the security system comprises:

receiving a second code from a device associated with the security system when the personal communication device is in proximity to the security system;

comparing the second code to the code received from the security system; and determining that the personal communication device is in proximity to the security system when the second code matches the code received from the security system.

4. The method of claim 2, wherein transmitting the disarm command comprises transmitting the disarm command over the local area network.

5. The method of claim 2, wherein transmitting the disarm command comprises transmitting the disarm command over a wide-area cellular network.

6. The method of claim 1, further comprising:

receiving an indication that the security system has been disarmed after transmitting the disarm command.

7. A personal communication device for automatically disarming a security system that monitors a home or a business, comprising:

a transceiver for wirelessly transmitting and receiving information;

a memory for storing processor-executable instructions; and a processor, coupled to the transceiver and the memory, for executing the processor-executable instructions that causes the personal communication device to:

register with the security system;

in response to registering with the security system, wirelessly receive a code from the security system;

determine that the personal communication device is in proximity to the security system; and in response to determining that the personal communication device is in proximity to the security system, transmit a disarm command by the personal communication device to disarm the security system, the disarm command comprising the code.

8. The personal communication device of claim 7, wherein the processor-executable instructions that causes the personal communication device to determine that the personal communication device is in proximity to the security system comprises instructions that causes the personal communication device to:

determine that the personal communication device is within range of a local area network associated with the security system.

9. The personal communication device of claim 7, wherein the processor-executable instructions that causes the personal communication device to determine that the personal communication device is in proximity to the security system comprises instructions that causes the personal communication device to:

receive a second code from a device associated with the security system when the personal communication device is in proximity to the security system;

compare the second code to the code received from the security system; and determine that the personal communication device is in proximity to the security system when the second code matches the code received from the security system.

10. The personal communication device of claim 8, wherein the processor-executable instructions that causes the personal communication device to transmit the disarm command comprises instructions that causes the personal communication device to:

transmit the disarm command over the local area network.

11. The personal communication device of claim 8, wherein the processor-executable instructions that causes the personal communication device to transmit the disarm command comprises instructions that causes the personal communication device to:

transmit the disarm command over a wide-area cellular network.

12. The personal communication device of claim 7, wherein the processor-executable instructions comprise further instructions that causes the personal communication device to:

receive an indication that the security system has been disarmed after transmitting the disarm command.

* * * * *